(12) United States Patent
Fathallah et al.

(10) Patent No.: US 9,266,765 B2
(45) Date of Patent: Feb. 23, 2016

(54) PROCESS FOR MANUFACTURING AN OBJECT FROM A SOL-GEL SOLUTION

(71) Applicant: Commissariat a l'energie atomique et aux ene alt, Paris (FR)

(72) Inventors: Tarek Fathallah, Voiron (FR); Gilles Marchand, Pierre-Chatel (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/348,260

(22) PCT Filed: Sep. 28, 2012

(86) PCT No.: PCT/EP2012/069277
§ 371 (c)(1),
(2) Date: Mar. 28, 2014

(87) PCT Pub. No.: WO2013/045671
PCT Pub. Date: Apr. 4, 2013

(65) Prior Publication Data
US 2014/0232046 A1    Aug. 21, 2014

(30) Foreign Application Priority Data
Sep. 29, 2011    (FR) ..................... 11 58768

(51) Int. Cl.
*B29C 47/76*    (2006.01)
*C03B 19/12*    (2006.01)
(Continued)

(52) U.S. Cl.
CPC . *C03B 19/12* (2013.01); *B28B 1/24* (2013.01); *B28B 7/344* (2013.01); *B28B 7/346* (2013.01); *B28B 7/348* (2013.01); *B28B 11/12* (2013.01);
(Continued)

(58) Field of Classification Search
CPC ............................ C03B 37/16; C04B 35/627
USPC .................. 264/102, 621, 220, 225, 240, 241
See application file for complete search history.

(56) References Cited

U.S. PATENT DOCUMENTS 5,686,031 A * 11/1997 Coronado et al. ........... 264/40.1
6,099,792 A    8/2000 Ganguli et al.
6,514,454 B1   2/2003 Ganguli et al.

FOREIGN PATENT DOCUMENTS

| EP | 0 719 735 A1 | 7/1996 |
| JP | 62 265127 | 11/1987 |
| JP | 64 56330 | 3/1989 |

OTHER PUBLICATIONS

JP 62265127 (Iwai Akihito et al.) Nov. 18, 1987 (abstract). [online] [retrieved on Jan. 6, 2015]. Retrieved from: IPDL PAJ Database.*

(Continued)

*Primary Examiner* — Stella Yi
(74) *Attorney, Agent, or Firm* — Oblon, McClelland, Maier & Neustadt, L.L.P.

(57) ABSTRACT

A process for manufacturing an object made of a constituent material obtained from a sol-gel solution, the process including, successively: a) introducing the sol-gel solution into a mold of the object to be manufactured; b) gelling the sol-gel solution; c) drying the gel obtained in b) in the mold, by which the gel is converted into the constituent material of the object, wherein the mold includes a closed chamber and includes a material configured to allow evacuation of gases formed during b) and/or c).

8 Claims, 3 Drawing Sheets

(51) Int. Cl.
  C03B 37/016 (2006.01)
  C03C 1/00 (2006.01)
  C04B 35/624 (2006.01)
  C04B 35/14 (2006.01)
  C04B 35/16 (2006.01)
  B28B 11/12 (2006.01)
  B28B 1/24 (2006.01)
  B28B 7/34 (2006.01)

(52) U.S. Cl.
  CPC ............... *C03B 37/016* (2013.01); *C03C 1/006* (2013.01); *C04B 35/14* (2013.01); *C04B 35/16* (2013.01); *C04B 35/624* (2013.01); *C03B 2201/02* (2013.01); *C03B 2201/42* (2013.01); *C03C 2203/26* (2013.01); *C04B 2235/3232* (2013.01); *C04B 2235/441* (2013.01); *C04B 2235/606* (2013.01); *C04B 2235/6027* (2013.01)

(56) References Cited

OTHER PUBLICATIONS

Martin, C.R. and Aksay, I.A. Microchannel molding: A soft lithography-inspired approach to micrometer-scale patterning. Journal of Materials Research, vol. 20, No. 8 (Aug. 2005), pp. 1995-2003.*

International Search Report Issued Dec. 7, 2012 in PCT/EP12/069277 Filed Sep. 28, 2012.

* cited by examiner

PROCESS FOR MANUFACTURING AN OBJECT FROM A SOL-GEL SOLUTION

TECHNICAL FIELD

The present invention relates to a process for manufacturing an object, for example, made of ceramic, glass or a hybrid inorganic/organic material involving a sol-gel process.

This process, which finds application in numerous fields by virtue of the diversity of the objects that it makes it possible to prepare, will be described hereafter.

PRIOR ART

Conventionally, the sol-gel process consists in preparing a solution containing precursors based on metal or metalloid elements (which may be organometallic compounds or metal salts) and one or more organic solvents, the resulting solution thereby forming a sol (which may also be designated sol-gel solution). On contact with ambient humidity, the precursors contained in this sol-gel solution undergo, in part, a step of hydrolysis and a step of condensation, to form an oxide network entrapping the solvent, so as to form a gel. The gel is then dried, to form at the end of said drying a monolithic object.

At the present time, two techniques of drying predominate:
evaporative drying; and
supercritical drying.

Evaporative drying consists in removing the organic solvent(s) present in the sol-gel solution by heating at atmospheric pressure or under reduced pressure (namely, a pressure below atmospheric pressure). At the end of said drying, a dry gel (also known as xerogel) is obtained in the form of a porous monolith, which can have, in a disadvantageous manner, cracks and fissuring due to the presence of high surface tensions at the level of the pores. What is more, when this technique is implemented with a sol-gel solution cast in a mould open to the exterior (when it involves in particular forming an object of more complex shape than a monolith), it turns out that the drying of the gel is not homogeneous in all directions, which can lead to an object of which the shape does not correspond to the starting mould. Finally, the non-homogeneous drying of the gel induces, moreover, additional mechanical stresses, which favour the appearance of fissures within the object.

Without being tied by theory, these observations may be explained by the following phenomena, illustrated by appended FIG. 1, representing a mould 1 comprising a sol-gel solution 3:
firstly, the drying begins by the face 5 in contact with the atmosphere by migration of the solvent upwards (this migration being represented by rising arrows in solid line on the parts (a), (b), (c), (d) of FIG. 1, the rising arrows in dotted line indicating the phenomenon of evaporation of the organic solvent(s), by means of which a meniscus 6 is formed reflecting the deformation of the gel during drying (cf. parts (a) and (b) of FIG. 1);
secondly, the drying progresses on the sides from the edges 7 of the meniscus 6 (cf. parts (c), (d) of FIG. 1).

To overcome the drawbacks linked to the implementation of evaporative drying in a mould, in patent application EP 0 719 735 a process has been proposed for manufacturing an object from a sol-gel solution comprising the following steps:
a step of depositing, on a liquid support, a sol-gel solution comprising a suspension of particles in a dispersing medium;
a step of gelling said solution to form a gelled body, the shape of which corresponds to the object that it is wished to manufacture; and
a step of drying the gelled body to produce the consolidated object.

Thanks to the use of a liquid support instead of and in place of a solid mould, a substantial reduction of the deformations induced by the contraction phenomena taking place during the processes of gelling and drying has been observed.

Nevertheless, this alternative process has the following drawbacks:
it only makes it possible to obtain objects in the form of thin films, which excludes the preparation of objects of complex shape;
there is a risk of contamination of the object to be manufactured by the liquid constituting the liquid support.

With regard to supercritical drying, it consists, as its name indicates, in subjecting the sol-gel solution to supercritical conditions, by means of which the gas phase and the liquid phase become non-discernable. This principle of drying is used, in particular, in the process described in U.S. Pat. No. 7,216,509.

Although this technique of drying can make it possible to obtain a drying of the object in its mould without volume shrinkage, the use of a mould opening onto the exterior nevertheless does not make it possible to obtain a control on all the faces of the object obtained, particularly on the face that is directly in contact with the exterior.

In light of what exists, the authors of the present invention thus set themselves the objective of proposing a process for manufacturing an object from a sol-gel solution not having the aforementioned drawbacks, namely:
limitations with regard to the shape of the object that it is wished to obtain;
a non-uniform drying that induces a deformation of the object compared to the shape that it is initially wished to obtain as well as a non-homogeneous microstructure.

DESCRIPTION OF THE INVENTION

To overcome these drawbacks, the authors of the present invention propose a process for manufacturing an object made of a constituent material obtained from a sol-gel solution comprising successively the following steps:
a) a step of introducing said sol-gel solution into a mould of the object to be manufactured;
b) a step of gelling the sol-gel solution;
c) a step of drying said gel obtained in b) in said mould, by means of which said gel is converted into the constituent material of the aforementioned object, characterised in that the mould consists of a closed chamber and comprises a material suitable for allowing the evacuation of the gases formed during step b) and/or step c).

Before going into greater detail in the description of the invention, the following definitions are made clear.

"Gas formed during step b) and/or step c)" is taken to mean gaseous molecules stemming from the transformation of the sol-gel solution into gel and/or the drying of said gel (these molecules being able to be, for example, molecules of solvent used in the sol-gel solution and reaction products stemming from the transformation of the sol-gel solution into gel).

"Mould consisting of a closed chamber" is taken to mean a mould comprising a cavity not being in direct communication with the ambient atmosphere surrounding said mould, which signifies in other words that, once the sol-gel solution is introduced into the mould, the latter is isolated from the ambient atmosphere surrounding said mould. This does not exclude that said mould comprises an input enabling the introduction of said solution, as soon as it is sealed once the sol-gel solution is introduced. The mould may comprise, moreover, added elements, such as removable parts in the form of integrated cylinders or beam for the formation of parts that can have holes corresponding to the shape of the added elements. In this case, a system of removing these added elements without opening the mould may be provided. The material able to evacuate the gases formed during the gelling and/or drying step forms an integral part of the mould and thus does not result from an added element, such as a cover added later. Advantageously, the mould consists of a closed single piece chamber constituted uniquely of said material able to evacuate the gases formed during the gelling step and/or the drying step. The confinement of the sol-gel solution in a homogeneous mould, in other words constituted of a same material as defined above, is advantageous. This enables an evacuation of the gases in said confinement material and, consequently, a uniform shrinkage of the gel.

Sol-gel solution is conventionally taken to mean a solution comprising one or more metal or metalloid molecular precursors and one or more organic solvents.

Thanks to the use of a mould with closed chamber comprising a material able to remove the gases formed during the gelling step and/or the drying step, the process of the invention fills the gaps encountered in the processes of the prior art and in particular makes it possible to obtain:

- objects that can have a complex geometry on all the faces;
- a control of the drying making it possible to make said drying uniform, which results in a uniform shrinkage of the gel and thus a respect of the relative dimensions of the object that it is wished to obtain with respect to the mould of this object and which also results in a better control of the microstructural characteristics of the object; i.e., in other words, a conservation of the proportionality between the dimensions of the object, when said gel contracts under the effect of the drying;
- a confinement of the atmosphere existing in the mould, which makes it possible to preserve the sol-gel solution and the gel from the exterior environment and thereby to prevent potential fissuring.

Preferably, the wall thickness of the mould is identical over the whole of the mould, which makes it possible to assure a uniform rate of drying at all points of the mould.

As mentioned above, the process of the invention comprises a step of introducing said sol-gel solution into a mould of the object to be manufactured, intended, after gelling and drying, to constitute the constituent material of the aforementioned object.

This step of introduction can take place by injection of said sol-gel solution into the mould until the latter is completely filled, for example, via a syringe passing through the wall of the mould (particularly when the mould is based on an elastomeric material).

The mould comprises a material suitable for allowing the release of the gases formed during the gelling step and/or the drying step.

A material meeting these specificities may be an elastomeric material, for example, an elastomeric material of the family of polysiloxanes.

More particularly, such a material may be an elastomeric material belonging to the family of polydimethylsiloxanes, this family being characterised by the presence of a sequence of repeating units of following formula (I):

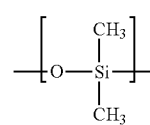

Apart from the capacity to enable the evacuation of the gases formed during the gelling and/or drying, elastomeric materials have the advantage of absorbing the mechanical stresses generated during the gelling step and drying step. Furthermore, these elastomeric materials have excellent moulding properties, which make it possible to respect perfectly the dimensions of the initial object.

Certain elastomeric materials, as is the case of polydimethylsiloxanes, are transparent to UV rays, which makes them interesting when it is wished to induce by UV rays the gelling of the sol-gel solution introduced into the mould.

The mould may be based on other organic materials than those mentioned above or other inorganic materials, from the moment that they are capable of enabling the evacuation of the gases formed during the gelling step and/or the drying step.

Prior to the introduction step a), the process of the invention may comprise a step of preparation of a mould of the object to be manufactured.

This preparation step may consist in moulding a part of shape corresponding to the object that it is wished to manufacture, by means of which a mould of the object to be manufactured results from this step, it being understood that this mould comprises a material suitable for allowing the evacuation of the gases formed during the gelling step and/or drying step.

Depending on the nature of the constituent material of the mould, this preparation step may take place according to different variants.

As an example, when the mould comprises a material of polydimethylsiloxane type, the step of preparation of the mould may comprise the following operations:

- an operation of placing in contact a part of shape corresponding to the object that it is wished to manufacture with a solution comprising:
- a polymer comprising, in its main chain, a sequence of repeating units of formula (I) as defined above and at least two terminal ethylenic groups; and
- a cross-linking agent;
- an operation of cross-linking said solution;
- an operation of removal of the starting part, by means of which said mould remains.

The operation of placing in contact may be carried out in a recipient wherein is placed the aforementioned part, said recipient being filled with a solution as defined above.

The aforementioned polymer may correspond to a polymer of following formula (II):

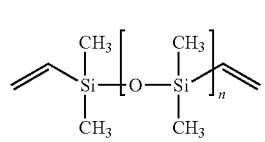

n representing the number of repetitions of the repeating unit taken between square brackets.

The cross-linking agent may be of various types.

When it involves carrying out a hot cross-linking, the cross-linking agent may be one or more organic peroxides, such as benzoyl peroxide, dicumyl peroxide and mixtures thereof.

When it involves carrying out a cold cross-linking, which is the case particularly with two component elastomers, the cross-linking agent may be:
- a tetrafunctional alkoyl silicate in the presence of an organostannic catalyst and a platinum salt;
- a cross-linking agent of the type R—SiX$_3$ or SiX$_4$ in the presence of a metal salt, wherein R may be an alkyl group and X may be a hydrolysable group, such as an acetoxy, alkoxy, amino, amido group.

The aforementioned solution may be available commercially, for example, in the form of a kit comprising two parts, a first part comprising said polymer and a second part comprising said cross-linking agent, these two parts having to be mixed to constitute the solution.

The cross-linking operation may consist, when the cross-linking has to be carried out hot, in heating the assembly formed by the part and the solution at a suitable temperature and duration (one then speaks of thermo cross-linking) to obtain the transformation of the solution into a solid material surrounding the part of shape corresponding to the object that it is wished to manufacture.

The operation of cross-linking may also be carried out at ambient temperature, when the cross-linking can be carried out cold.

At the end of this operation of cross-linking, the part is removed so as to leave remaining only the mould of the object to be manufactured. This operation of removal may be preceded by an operation of cutting the solid material into at least two parts so as to be able to remove the part. In this case, it is understood that the cut parts will be reassembled after the removal of the part, while arranging, if needs be, an input intended for the subsequent introduction of the sol-gel solution into the mould.

It is also possible to envisage the manufacture of the mould in several separate parts (for example, in two parts), assembling these parts by simple mechanical pressure or by electromagnetism and dismantling said parts without it being necessary to carry out a cutting operation.

As mentioned above, the sol-gel solution is a solution comprising one or more metal or metalloid molecular precursors and one or more organic solvents.

This sol-gel solution may also be prepared prior to the step of introduction a), this step of preparation consisting in placing in contact one or more metal or metalloid precursors molecular with a medium comprising one or more organic solvents and potentially other adjuvants, such as water, a catalyst.

The metal may be selected from a group constituted of the transition metals, lanthanide metals and metals known as post-transitional of columns IIIA and IVA of the periodic table of elements. The metal transition element may be selected from Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt). The lanthanide element may be selected from La, Ce, Pr, Nd, Sm, Eu, Gd, Tb, Dy, Er, Yb. The post-transitional metal element may be selected from group IIIA elements Al, Ga, In and Tl and IVA group elements Ge, Sn and Pb.

The metalloid element is advantageously selected from Si, Se, Te.

It may also be any combinations between transition metals, lanthanide metals, post-transitional metals and metalloids.

The metal or metalloid molecular precursors may be in the form of inorganic metal or metalloid salts such as halogenides (fluorides, chlorides, bromides, iodides), alkaline salts (such as, for example, sodium silicate).

The metal or metalloid molecular precursors may also be in the form of metal or metalloid organometallic compounds, such as, particularly, alkoxides, for example, those responding to the formula $(RO)_nM$, in which M designates the metal or the metalloid, n represents the number of ligands bonded to M, this number also corresponding to the degree of oxidation of M and R represents an alkyl group, linear or branched, which can comprise from 1 to 10 carbon atoms or a phenyl group.

The metal or metalloid molecular precursors, as described above, are placed in contact with a medium comprising an organic solvent, so as to form a sol-gel solution.

Preferably, the organic solvent is selected from:
- aliphatic or aromatic monoalcohols, saturated or unsaturated, for example those of formula $R^1$—OH, in which $R^1$ represents an alkyl group, linear or branched, comprising from 1 to 30 carbon atoms, preferably from 1 to 10 carbon atoms or a phenyl group;
- diols, for example, those of formula HO—$R^2$—OH, in which $R^2$ represents an alkylene group, linear or branched, comprising from 1 to 30 carbon atoms, preferably from 1 to 10 carbon atoms, or a phenylene group.

As examples of diols, ethylene glycol, diethylene glycol or triethylene glycol may be cited.

Apart from the presence of one or more molecular precursors and one or more organic solvents, the sol-gel solution may comprise other adjuvants, such as:
- water, which can contribute to facilitating the process of gelling the sol-gel solution;
- catalysts making it possible to speed up the kinetic of the hydrolysis and condensation reactions during the transformation of the sol-gel solution into gel (these catalysts being able to be an inorganic acid, such as inorganic acid, an organic acid, such as acetic acid);
- organic or inorganic pigments;
    - organic compounds with optical properties, such as fluorophore compounds, phosphorescent compounds, anti-UV agents, non-reflecting agents or compounds having a reactive function with analytes (with a view to assuring, for example, the detection of analytes).

Prior to the introduction step a), the mould may be made to undergo a step of treatment of its internal surface (in other words the surface intended to be in contact with the sol-gel solution), so as to minimise the adherence of the gel (resulting from the gelling of the sol-gel solution) and the constituent material of the object (after transformation of the gel into the constituent material of the object) and thereby facilitate the removal of said object from the mould. It is understood that this treatment must not modify, or in any case not in a substantial manner, the permeability of the mould vis-à-vis the gases. This surface treatment step may consist in carrying out a hydrophobic silanization of the internal surface of the mould (for example, by means of reagents such as a perfluorinated silane, trichloromethylsilane).

The mould, wherein is introduced the sol-gel solution, may be fixed on a moveable system, for example, rotating, which is going to make it possible to obtain parts of better quality, the movement induced by the system, for example, a movement of rotation, making it possible to avoid a phenomenon of collapse of the gel during the process of drying or in other words making it possible to counter the effects of gravity. Advantageously, the moveable system is brought into operation uniquely after the introduction of the sol-gel solution and after the gelling of the sol-gel solution concomitantly with the implementation of a step of drying c). This applied movement may also contribute to facilitating the subsequent operation of removing from the mould particularly for microstructured parts in contact with one of the faces of the mould, particularly the lower face.

Once the step of introduction a) is finished, the process comprises a step of gelling the sol-gel solution into gel.

This step may consist in placing the mould thereby filled at rest for a sufficient duration for the transformation of the sol-gel solution into gel. This duration may be determined by those skilled in the art by routine experiments and may vary particularly as a function of the volume of the sol-gel solution, the proportions and the quantities of precursors used in this sol-gel solution.

After the gelling step, the process of the invention comprises a step of drying the gel (step c), by means of which the gel comprised in the mould is transformed into the constituent material of the object to be manufactured.

This material may be a material of the ceramic type, of the glass type or instead a material of the hybrid inorganic (ceramic or glass)-organic material type, the nature of the material being a function of the composition of the starting sol-gel solution.

This step of drying may be carried out according to various variants, among which may be cited:
drying with supercritical fluid, such as supercritical carbon dioxide;
drying by heating;
drying under vacuum;
drying under controlled atmosphere;
a combination of the aforementioned drying methods.

It is not excluded that the step of drying can be implemented by a combination of the aforementioned variants. In particular, when the step of drying combines both drying by heating and drying under vacuum, this can make it possible to reduce substantially the duration of the drying compared to drying by heating.

As an example, the drying step may consist in placing the mould in a rotating oven and in heating said mould to an appropriate temperature and duration (for example, 45° C. for 5 days) to enable the transformation of the gel into the constituent material of the object to be manufactured, this heating being able to be combined with a placing under vacuum.

The object obtained according to the process of the present invention has, compared to the mould, a reduction of its dimensions without deformation of its shape.

The object formed by the process of the invention may be in its turn used as model to constitute a mould, which could be used, then, in a process comprising steps according to the invention (aforementioned steps a), b) and c)), these operations being able to be repeated as many times as possible until an object having the desired dimensions is obtained. This may be particularly interesting to form micrometric microstructured parts, without having to resort to microstructuring means.

As already mentioned, the process of the invention makes it possible to envisage the preparation of objects made of ceramic, glass or hybrid inorganic-organic material, of the most diverse shapes, this process thereby finding application in numerous fields, such as:
the field of the detection of gases, the process of the invention being able to be used to conceive sensors based on ceramic or glass making it possible to guide electromagnetic waves, being able to be in the form of particular structures (such as optical fibres);
the field of lasers, the process of the invention being able to be used in particular to conceive dye lasers, the latter being able to be incorporated in the solution-gel which serves as basis for the preparation of lasers, the monoliths obtained by the process of the invention having precise dimensions and excellent surface quality;
the field of microfluidics, the process of the invention being able to be in particular used to conceive microchannels, which can be elaborated on supports, such as glass plates;
the field of chemical analysis, the process of the invention being able to be in particular used to conceive microcolumns intended to enter into the constitution of chromatographic devices, such as gas phase chromatography;
the field of electro-osmosis, the process of the invention being able to be used particularly to conceive microporous membranes and devices with microchannels;
the field of electrophoresis, the process of the invention being able to be used particularly to conceive microreactors;
the field of optics, the process of the invention being able to be used to conceive lenses, wave or light guides and more particularly Fresnel lenses, such as microlenses, and arrays of microlenses;
the field of energy, the process of the invention being able to be used to conceive electrode materials, particularly for fuel cells or supercapacitors or to conceive materials for storing fuel, such as hydrogen;
the field of microelectronics, the process of the invention being able to be used to conceive insulating materials, piezoelectric materials or dielectric materials, said materials being able to be microstructured.

Concerning light guides, these may be formed by means of a porous material obtained by the sol-gel technique, enclosing a chemical sensor intended to react in the presence of an analyte, such as a gaseous analyte, the optical properties of the material being able to change in the presence of a given analyte. In this way it is possible to achieve high detection sensitivity.

Concerning the formation of microstructured devices, thanks to the process of the invention, it is thus possible to avoid resorting to microstructuring processes such as etching, the latter being able to leave an uncontrolled surface state.

To do so:
a microstructured part is used, intended to be reproduced, so as to form a mould;
this part is reproduced by the process of the invention, which makes it possible to obtain a part having microstructures with reduced dimensions.

It is possible to reiterate these operations, by forming a mould from the part obtained previously by the process of the invention. By multiplying the iterations, a micrometric part may be obtained without having to resort to microstructuring means.

Apart from the advantages already mentioned above, the process of the invention also proves easy to implement, and is efficient at low temperatures, which makes it compatible with the use of numerous organic molecules.

The invention will now be described with reference to the particular embodiments given below for illustrative and non-limiting purposes.

DETAILED DESCRIPTION OF PARTICULAR EMBODIMENTS

Example 1

Figure 1:
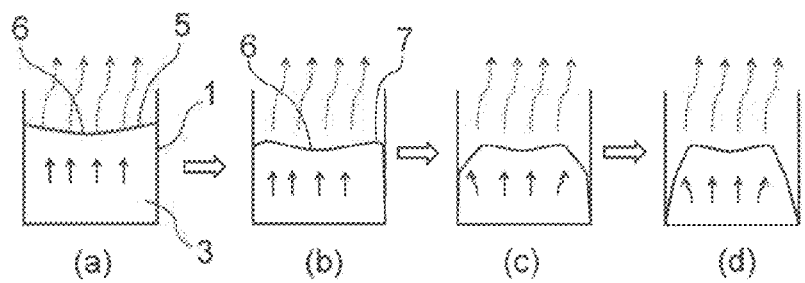
FIG. 1 represents the different steps (respectively parts a, b, c, d) of the preparation of a monolith from a sol-gel solution.

This example illustrates the preparation of an object from the process of the invention, said object being a part of 1 euro.

a) Manufacture of the Mould

The mould is prepared by the following succession of operations:

1—Preparation using a spatula of a mixture (20 g) of two components, respectively polydimethylsiloxane (PDMS) and a cross-linking agent according to a ratio of 10/1 (these components being available from Dow-Corning under the denomination SylGard 184);

2—Casting of this mixture in a Plexiglas recipient (of dimensions 5 cm/5 cm) over a height of 5 mm thickness;

3—Subjecting the assembly to strong vacuum for 20 minutes, then breaking the vacuum followed by heat treatment at 70° C. for 2 h;

4—After heat treatment of the mixture (thereby bringing about the cross-linking of the PDMS), placing the part to be moulded on the PDMS layer obtained;

5—Preparation using a spatula of a mixture (20 g) of two components, respectively polydimethylsiloxane (PDMS) and a cross-linking agent according to a ratio of 10/1 (these components being available from Dow-Corning under the denomination SylGard 184) followed by degassing under strong vacuum (20 minutes, breaking the vacuum);

6—Casting of the mixture on the part to be moulded (laid on the PDMS layer implemented beforehand) up to a height of 5 mm above the part;

7—Application of a strong vacuum for 30 minutes to degas the assembly;

8—Heating the assembly to 80° C. for 2 hours, so as to bring about the cross-linking of the polydimethylsiloxane, by means of which it forms a solid layer around the part;

9—Manual removal from the mould;

10—Cutting the surplus of PDMS until a uniform mould thickness of 5 mm is obtained;

11—Opening of the PDMS mould in two parts using a scalpel to remove the starting part taken in the PDMS mould.

The two parts of the PDMS mould are then stuck back together after plasma activation according to the following conditions:

1—The two parts of the mould are placed in an $O_2$ plasma ($O_2$ Plasma, AST Product Inc.), the following conditions being applied to activate the surface functions of the PDMS ($PO_2$ 1 bar; Power 20 Watts; Duration 20 sec; Adaptation network 50-50%; Gas 120; Gas flow 60; Operating point 0.5);

2—After application of the plasma, the two surfaces of the mould to be stuck together are placed in contact. A pressure is exerted to improve the contact between the two surfaces and thereby to improve the sticking together;

3—The assembly is placed in the oven at 80° C. for 4 h.

The two parts of the mould are thus stuck together, by means of which a mould of the part is obtained, the latter having left its imprint inside said mould.

b) Manufacture of the Sol-Gel Solution

The sol-gel solution is prepared by the following succession of operations:

1—Mixing at −25° C. under stirring of 3.4 mL (0.023 mol) of trimethoxysilane (681-84-5 Sigma-Aldrich) and 4.5 mL (0.11 mol) of anhydrous methanol, to which is added 0.04 mL ((0.17 mmol) of APTES (tetramethylorthosilicate 919-30-2 catalyst supplied by Sigma-Aldrich);

2—Addition of 1.7 mL (0.094 mol) of ultrapure water;

3—After 30 seconds of stirring, removal with a syringe of 10 mL of the sol-gel solution.

c) Manufacture of the Object as Such

The object is prepared according to the following succession of operations:

1—Prior conditioning of the mould at −25° C.;

2—Introduction of a needle into the upper part of the mould to enable the evacuation of air, when the sol-gel solution will be injected;

3—Insertion of the needle of the syringe containing the sol-gel solution (which has just been removed) into the mould followed by a slow injection of the solution to avoid having a turbulent regime at the output of the needle and to avoid the formation of air bubbles on the walls of the mould;

4—Removal of the air evacuation needle when the mould is filled with sol-gel solution and maintaining a certain pressure inside the mould with the syringe before removing it;

5—Placing the mould containing the sol-gel solution at rest at ambient temperature for 30 minutes until a gel is obtained;

6—Drying the assembly in a rotating oven (Agilent technologies, model GA) at 40° C. for 4 days at a rotation speed below one rotation per minute;

7—After drying, opening the PDMS mould in two parts to remove the sol-gel monolith thereby manufactured.

Figure 2:
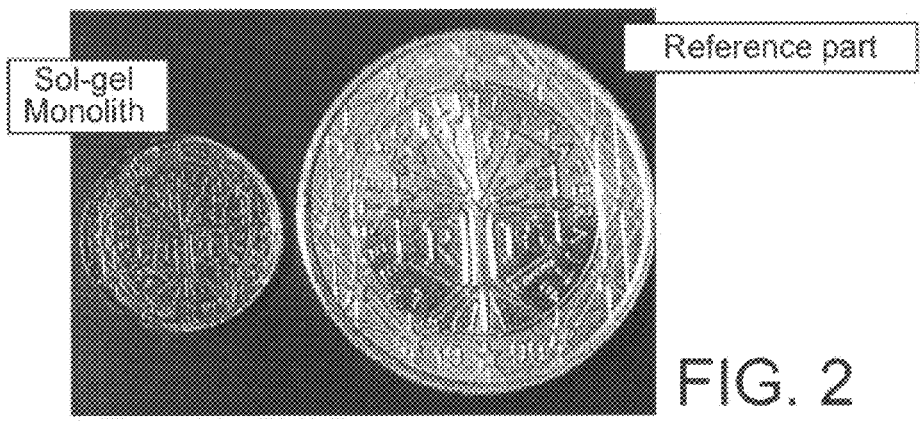
FIG. 2 represents a photograph of the object obtained according to example 1 (designated "Sol-gel monolith"), this object being placed beside its model (designated "Reference part").

The object obtained (represented in appended FIG. 2 beside the part that has served to conceive the mould) has the same patterns on the two faces as those of the original part. Given that the object is transparent, by observing one face, it is also possible to see the patterns of the opposite face.

The object obtained has smaller dimensions than those of the original part (the dimensions being around two times less than those of the original part), without this affecting the reproduction of the patterns present on the two faces as well as on the edge.

Example 2

This example illustrates the preparation of an object from the process of the invention, said object being a decorative object having a diamond shape.

a) Manufacture of the Mould

The mould is prepared in conditions similar to those of example 1, from a diamond-shaped decorative object having the following dimensions: 50 mm length, 29.5 mm width and 18 mm height.

b) Manufacture of the Sol-Gel Solution

The sol-gel solution is prepared in conditions similar to those of example 1.

c) Manufacture of the Object as Such

The object is manufactured in conditions similar to those of example 1.

Figure 3:
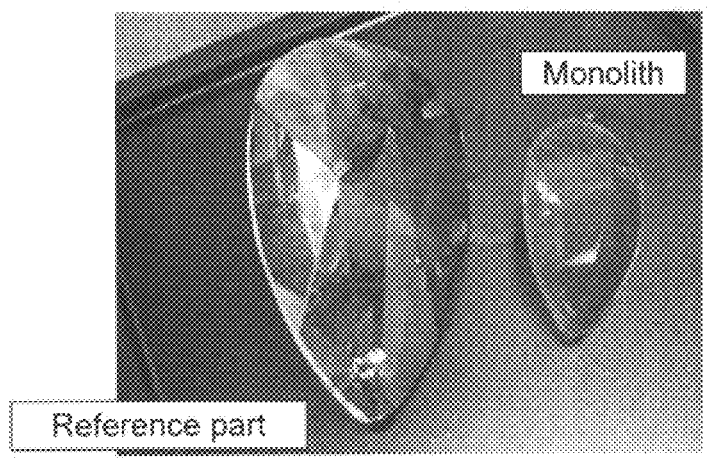
FIG. 3 represents a photograph of the object obtained according to example 2 (designated "Monolith"), said object being placed beside its model (designated "Reference part").

The object obtained (represented in appended FIG. 3 beside the original object that has served to conceive the mould) respects with great precision the sides of the original object on all the faces, with reduced dimensions of 42% on all the sides (the dimensions being respectively 29 mm for the length, 17 mm for the width and 10.5 mm for the height). The shrinkage during the drying step has thus been uniform for all the axes of the object.

Example 3

Figure 4:
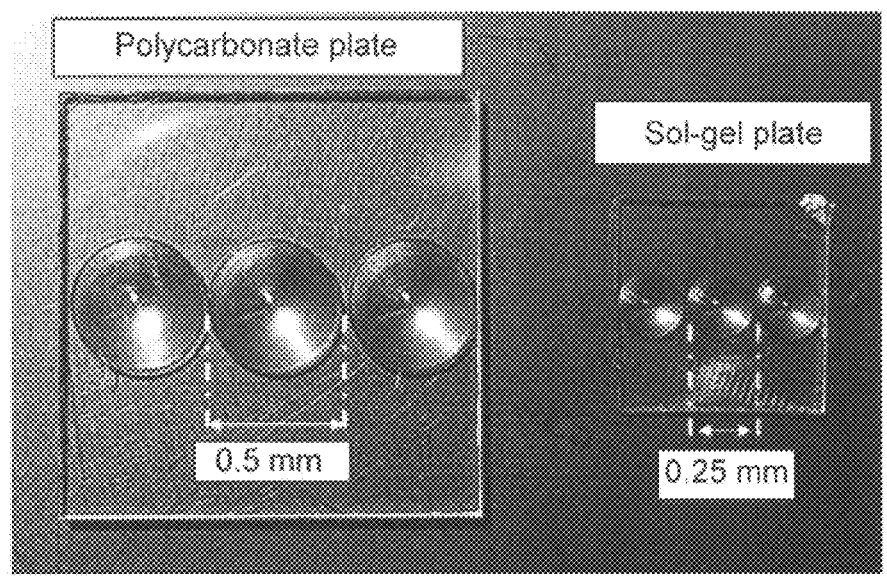
FIG. 4 represents a photograph in top view of the object obtained from example 3 (designated "Sol-gel plate"), this object being placed beside its model (designated "Polycarbonate plate").

This example illustrates the preparation of an object from the process of the invention, said object being a plate comprising three Fresnel microlenses (etched on one of the faces of the plate), said plate being illustrated in appended FIG. 4 (said plate being designated "Polycarbonate plate").

a) Manufacture of the Mould

The mould is prepared in conditions similar to those of example 1, from the plate represented in FIG. 4.

b) Manufacture of the Sol-Gel Solution

The sol-gel solution is prepared in conditions similar to those of example 1.

c) Manufacture of the Object as Such

The object is manufactured in conditions similar to those of example 1.

The object obtained (represented in appended FIG. 4 beside the part that has served to conceive the mould) has the same patterns on one of the faces as those of the original part.

Figure 5:
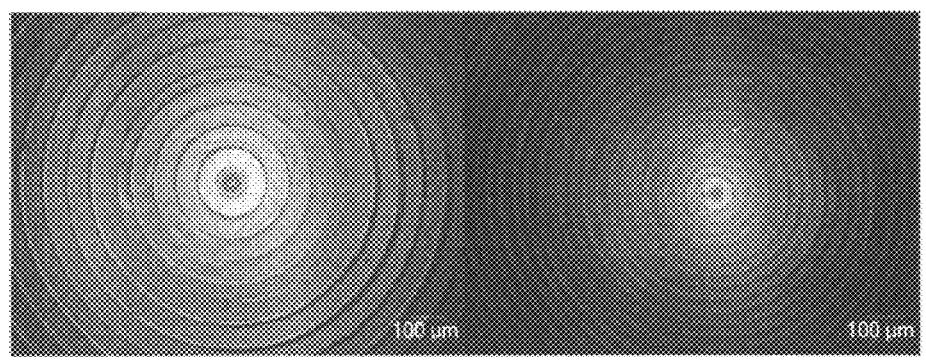
FIG. 5 represents a blown up photograph in top view of the object obtained from example 3 (right hand view) and of its model (left hand view).

The object obtained has smaller dimensions than those of the original part (the dimensions being around two times less than those of the original part), without this affecting the reproduction of the patterns. Given that the patterns of the original part have a spacing of 60 µm, the patterns of the part made of sol-gel after drying have a spacing of 30 µm. The reproduction of the original part has been respected such that even the surface defects of this part are observed on the sol-gel part (as stands out from FIG. 5).

In conclusion, the process of the invention enables the formation of Fresnel type lenses.

Thus, the invention makes it possible to form a lens made of microstructured glass without encountering the drawbacks conventionally encountered when it is sought to form such a lens by etching processes. In fact, when it is wished to form a device made of microstructured glass, such as a Fresnel lens, etching processes do not make it possible to obtain a perfectly smooth surface.

However, in the field of optics, it is preferred to use glass, due to its good heat resistance or its low absorption to UV radiation. This is why it is preferred to use glass lenses compared to plastic lenses, the latter being however less costly and easier to form.

The invention makes it possible to overcome this drawback by taking, as starting material, a plastic lens, which is going to serve as basis for the formation of a mould. Then, by using the mould, it is possible to obtain a lens from the sol-gel technique, and thus in a material such as glass, without requiring the implementation of etching processes and the associated drawbacks (concerning the costs and the difficulties of having a perfectly smooth surface).

Example 4

This example illustrates the preparation of an object from the process of the invention, said object being a light guide.

a) Nature of the Mould

The mould used is a commercially available tube made of silicone, of 3 mm internal diameter, 1 mm thickness and 26 cm length.

This tube is placed in a desiccator. A degassing under strong vacuum is applied for 3 hours to eliminate potential molecules of low molecular weight introduced during the production of the tube (plastifiers, additives, etc.). This step makes it possible to avoid polluting the optical fibre by these molecules.

b) Manufacture of the Sol-Gel Solution

The sol-gel solution is prepared in conditions similar to those of example 1.

c) Manufacture of the Object as Such

A Teflon stopper is introduced on one of the ends of the aforementioned tube. The face of the stopper that will be in contact with the sol-gel has been polished beforehand until a smooth surface has been obtained.

Then, the object is manufactured in conditions similar to those of example 1.

Figure 6:
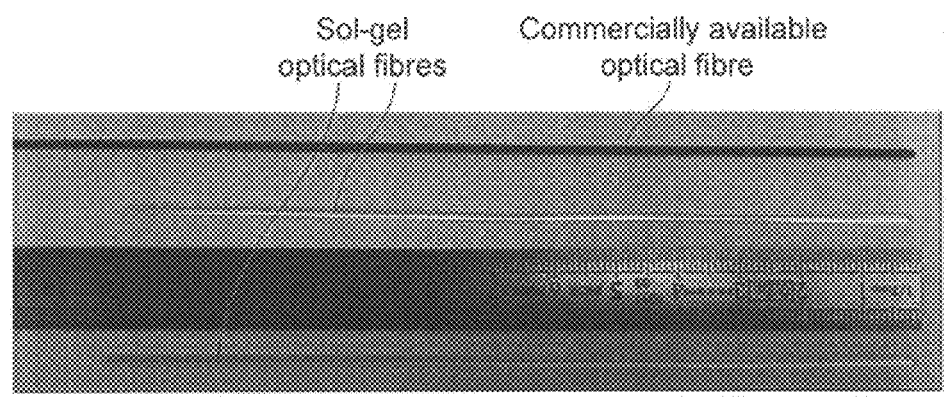
FIG. 6 represents a photograph according to a side view of the objects obtained according to example 4 (designated "Sol-gel optical fibres"), these objects being placed beside their model (designated "Commercially available fibre").
Figure 7:
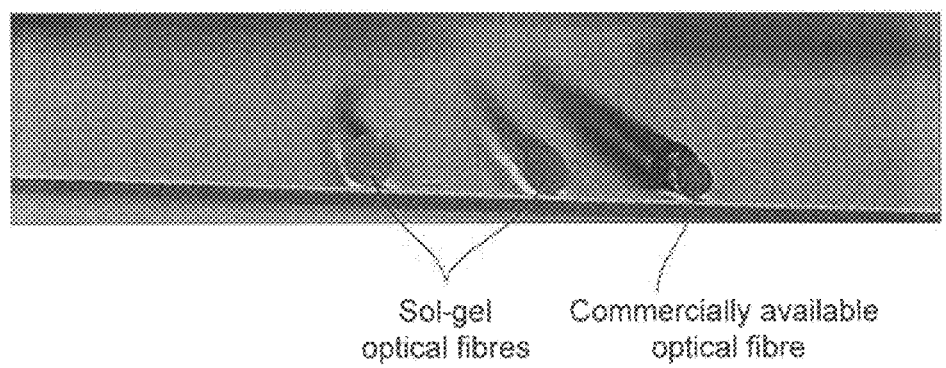
FIG. 7 represents a photograph of a view of a flat face of the objects obtained according to example 4 (designated "Sol-gel optical fibres"), these objects being placed beside their model (designated "Commercially available fibre").

Two sol-gel objects obtained by the present invention are represented in appended FIGS. 6 and 7 beside a commercially available fibre. The monoliths are 13 cm long and have a diameter of 1.3 mm.

Example 5

This example illustrates the preparation of an object from the process of the invention, said object being an optical lens based on silicon and titanium oxide ($TiO_2$—$SiO_2$).

a) Treatment of the Lens (which Here Plays the Role of Master)

A surface treatment by FDTS (corresponding to perfluorodecyltrichlorosilane) after plasma activation of the surface of the lens is necessary. Polydimethylsiloxane (PDMS) can form covalent bonds with the glass for the step of cross-linking the mould which could make removing the lens from the mould impossible. This treatment makes it possible to avoid the formation of such covalent bonds of the master with the mould.

b) Manufacture of the Mould

The mould is prepared by the following succession of operations:

1—Preparation using a spatula of a mixture (20 g) of two components, respectively polydimethylsiloxane (PDMS) and a cross-linking agent according to a ratio of 10/1 (these components being available from Dow-Corning under the denomination SylGard 184);

2—Casting of this mixture in a Plexiglas recipient (of dimensions 5 cm/5 cm) over a height of 5 mm thickness;

3—Subjecting the assembly to strong vacuum for 20 minutes, then breaking the vacuum followed by heat treatment at 80° C. for 1 hour;

4—After heat treatment of the mixture, (thereby bringing about the cross-linking of the PDMS), placing the lens to be moulded on the PDMS layer obtained;

5—Preparation using a spatula of a mixture (20 g) of two components, respectively polydimethylsiloxane (PDMS) and a cross-linking agent according to a ratio of 10/1 (these components being available from Dow-Corning under the denomination SylGard 184) followed by degassing under strong vacuum (20 minutes, breaking the vacuum);

6—Casting the mixture on the part to be moulded (laid on the PDMS layer implemented beforehand) up to a height of 5 mm above the lens;

7—Application of a strong vacuum for 30 minutes to degas the assembly;

8—Heating the assembly to 80° C. for 1 hour, so as to bring about the cross-linking of the polydimethylsiloxane, by means of which it forms a solid layer around the part;

9—Manual removal from the mould;

10—Cutting the surplus of PDMS until a uniform mould thickness of 5 mm is obtained;

11—Opening of the PDMS mould into two parts using a scalpel to remove the starting part taken in the PDMS mould.

The two parts of the PDMS mould are then stuck back together after plasma activation according to the following conditions:

1—The two parts of the mould are placed in an $O_2$ plasma ($O_2$ Plasma, AST Product Inc.), the following conditions being applied to activate the surface functions of the PDMS ($PO_2$ 1 bar; Power 20 Watts; Duration 20 sec; Adaptation network 50-50%; Gas 120; Gas flow 60; Operating point 0.5);

2—After application of the plasma, the two surfaces of the mould to be stuck together are placed in contact. A pressure is exerted to improve the contact between the two surfaces and thereby improve the sticking together;

3—The assembly is placed in the oven at 80° C. for 4 hours. The two parts of the mould are thereby stuck together by means of which a mould of the part is obtained, the latter having left its imprint inside said mould.

c) Manufacture of the Sol-Gel Solution

The sol-gel solution is prepared by the following succession of operations:

1—Preparation of the solution 1: Mixing at ambient temperature under stirring of 2.330 mL (0.0104 mol) of tetraethyl orthosilicate (78-10-4 Sigma-Aldrich) and 300 µL (0.017 mol) of water, to which is added 1 mL of anhydrous ethanol. Addition of 0.5 µl of 1 molar hydrochloric acid under stirring;

2—Placing the solution 1 in a hermetically sealed pill machine in the oven at 80° C. for 12 hours to hydrolyse the precursor;

3—After 12 hours of hydrolysis, the solution 1 is taken out of the oven and cooled to ambient temperature;

4—Removal of 2 mL of the solution 1 in a pill machine, to which is added 979 µl of titanium (IV) butoxide (5593-70-4 Sigma-Aldrich). Mix well and leave to act for 1 hour;

5—Preparation of the solution 2: 5 mL of anhydrous ethanol in a pill machine, to which is added 600 µl of ammonia solution (aqueous solution of ammonium hydroxide). It is necessary to hermetically seal the pill machine as soon as the ammonia solution is added since ammonia ($NH_3$) is highly volatile. The aqueous solution of ammonium hydroxide is used for the condensation under basic catalysis of the precursors to form the gel;

6—Preparation of the sol-gel solution: Add 1.5 mL of the solution 2 to the prior mixture (solution 1+titanium (IV) butoxide). The pill machine is hermetically sealed and the solution is then stirred gently (to avoid an excessive formation of bubbles) up to homogenisation. Leave to rest for around 1 minute until the bubbles disappear. In this way, a mixture of around 30% molar titanium precursor, and thus 70% molar silicon precursor, is obtained;

7—Removal with a syringe of 2 mL of the sol-gel solution. This step as well as the injection step that follows must be carried out rapidly after the preceding step to be able to inject the sol (sol-gel solution) before its cross-linking.

d) Manufacture of the Object as Such

The object is prepared according to the following succession of operations:

1—Introduction of a needle into the upper part of the mould to enable the evacuation of air, when the solution of sol-gel will be injected;

2—Insertion of the needle of the syringe containing the sol-gel solution (which has just been removed according to step 7 described previously) into the mould followed by a slow injection of the solution to avoid having a turbulent regime at the output of the needle and to avoid the formation of air bubbles on the walls of the mould;

3—Removal of the injection needle when the mould is filled, removing the air evacuation needle after from the solution;

4—Leaving the mould containing the sol-gel solution to rest at ambient temperature for 1 hour until a dense gel is obtained;

5—Drying the assembly in a rotating oven (Agilent technologies, model GA) at 45° C. for 5 days at a rotating speed less than one rotation per minute;

6—After drying, opening of the PDMS mould in two parts to remove the sol-gel monolith thereby manufactured.

The object obtained has the characteristics of the concave plane lens of the lens that has served as master. The dimensions of the final sol-gel part (diameter and thickness) have undergone a shrinkage of around 56% compared to the original glass master. Original master (Ø=12.29 mm, thickness=3.27 mm) Part obtained from the sol-gel solution (Ø=10.06 mm, thickness=1.49 mm).

The manufacture of the TiO2-SiO2 sol-gel solution makes it possible to obtain components having interesting characteristics for certain applications. In fact this type of material makes it possible to obtain an optical index considerably higher than a sol-gel solution based only on SiO2. This type of sol-gel also has a super-hydrophilic character, which is very interesting for certain micro-fluidic applications.

The invention claimed is:

1. A process for manufacturing an object made of a constituent material obtained from a sol-gel solution, the process comprising, successively:
   a) introducing the sol-gel solution into a mold of the object to be manufactured;
   b) gelling the sol-gel solution;
   c) drying the gel obtained in b) in the mold, by which the gel is converted into the constituent material of the object, wherein
   the mold includes a closed chamber, isolated from ambient atmosphere surrounding the mold, once the sol-gel solution is introduced therein, and
   the chamber is entirely composed of a material configured to allow evacuation of gases formed during the b) gelling and/or the c) drying, the material being an elastomeric material.

2. The process according to claim 1, wherein a material of the mold is a material of the family of polysiloxanes.

3. The process according to claim 1, wherein a material of the mold is a material of the family of polydimethylsiloxanes.

4. The process according to claim 1, further comprising, before the a) introducing, preparing the mold of the object to be manufactured.

5. The process according to claim 1, further comprising, before the a) introducing, preparing the sol-gel solution.

6. The process according to claim 1, wherein a wall thickness of the mold is identical over the whole of the mold.

7. The process according to claim 1, wherein the mold is cast in a plurality of parts, the parts bonded together by plasma activation.

8. The process according to claim 1, wherein the mold is cast in a plurality of parts, the parts are placed in an oxygen plasma for a predetermined time, and the parts are bonded together by an external pressure to force contact of the parts after the oxygen plasma.

* * * * *